(12) United States Patent
Kotani et al.

(10) Patent No.: US 9,286,485 B2
(45) Date of Patent: Mar. 15, 2016

(54) USING TRUST POINTS TO PROVIDE SERVICES

(75) Inventors: Seigo Kotani, Sunnyvale, CA (US); Masato Suzuki, Chofu (JP)

(73) Assignee: Fujitsu Limited, Kawasaki-shi (JP)

( * ) Notice: Subject to any disclaimer, the term of this patent is extended or adjusted under 35 U.S.C. 154(b) by 0 days.

(21) Appl. No.: 13/053,670

(22) Filed: Mar. 22, 2011

(65) Prior Publication Data

US 2011/0238260 A1  Sep. 29, 2011

Related U.S. Application Data

(63) Continuation-in-part of application No. 12/879,226, filed on Sep. 10, 2010, now Pat. No. 9,059,978.

(60) Provisional application No. 61/316,498, filed on Mar. 23, 2010.

(51) Int. Cl.
| | | |
|---|---|---|
| G06F 7/00 | (2006.01) |
| G06F 21/00 | (2013.01) |
| G01C 21/00 | (2006.01) |
| G06F 21/62 | (2013.01) |
| G06F 21/31 | (2013.01) |
| G06F 21/44 | (2013.01) |
| G06F 21/60 | (2013.01) |
| H04L 29/06 | (2006.01) |

(52) U.S. Cl.
CPC ............ *G06F 21/6218* (2013.01); *G06F 21/31* (2013.01); *G06F 21/445* (2013.01); *G06F 21/606* (2013.01); *H04L 63/08* (2013.01); *G06F 2221/2129* (2013.01); *H04L 63/061* (2013.01)

(58) Field of Classification Search
USPC .......................................................... 368/52
See application file for complete search history.

(56) References Cited

U.S. PATENT DOCUMENTS

| | | | | |
|---|---|---|---|---|
| 5,892,900 | A | * | 4/1999 | Ginter et al. ...................... 726/26 |
| 6,148,656 | A | * | 11/2000 | Breton ........................... 73/23.31 |
| 6,775,602 | B2 | * | 8/2004 | Gordon et al. ............... 701/29.6 |
| 6,965,996 | B2 | * | 11/2005 | Hirano et al. .................. 713/176 |

(Continued)

FOREIGN PATENT DOCUMENTS

| | | | | |
|---|---|---|---|---|
| CN | 1636414 A | 7/2005 | ............... H04Q 7/00 |
| CN | 1890638 | 1/2007 | ............... G06F 9/455 |

(Continued)

OTHER PUBLICATIONS

Makowitz, Rainer, Freescale Halbleiter Deutschland GmbH, Flexray—A Communication Network for Automotive Control Systems, IEEE No. 1-4244-0379-0 (2006) (http://www.freescale.com/flexray).*

(Continued)

*Primary Examiner* — John R Olszewski
*Assistant Examiner* — Jean-Paul Cass
(74) *Attorney, Agent, or Firm* — Baker Botts L.L.P.

(57) ABSTRACT

In certain embodiments, processors may operate to establish trust with trust point systems by performing a user authentication, a platform authentication, and an environment authentication. The processors may communicate information with the trust point systems in response to establishing trust. In certain embodiments, the trust point systems may cooperate to provide a variety of services, such as escorting, battery charging, vehicle security, and/or emissions reporting services.

8 Claims, 14 Drawing Sheets

(56) References Cited

U.S. PATENT DOCUMENTS

| | | | |
|---|---|---|---|
| 7,000,114 B1* | 2/2006 | Hasebe et al. | 713/176 |
| 7,013,392 B1* | 3/2006 | Sasaki et al. | 713/187 |
| 7,184,704 B2* | 2/2007 | Kliland et al. | 455/41.2 |
| 7,275,156 B2* | 9/2007 | Balfanz et al. | 713/168 |
| 7,281,133 B2* | 10/2007 | Ginter et al. | 713/176 |
| 7,353,396 B2* | 4/2008 | Micali et al. | 713/176 |
| 7,412,721 B2* | 8/2008 | Torii et al. | 726/22 |
| 7,483,438 B2* | 1/2009 | Serghi et al. | 370/401 |
| 7,571,312 B2* | 8/2009 | Scarlata et al. | 713/155 |
| 7,587,595 B2* | 9/2009 | Scarlata et al. | 713/167 |
| 7,587,765 B2 | 9/2009 | Challener et al. | |
| 7,590,867 B2* | 9/2009 | Scarlata et al. | 713/193 |
| 7,613,921 B2* | 11/2009 | Scaralata | 713/167 |
| 7,620,948 B1 | 11/2009 | Rowe et al. | 717/171 |
| 7,636,442 B2* | 12/2009 | Scarlata et al. | 380/283 |
| 7,676,229 B2* | 3/2010 | Albina et al. | 455/445 |
| 7,746,071 B2* | 6/2010 | Sakhaii | 324/309 |
| 7,781,390 B2* | 8/2010 | Singleton et al. | 510/424 |
| 7,840,801 B2* | 11/2010 | Berger et al. | 713/164 |
| 7,871,973 B1* | 1/2011 | Singleton et al. | 510/424 |
| 7,906,937 B2* | 3/2011 | Bhade et al. | 320/109 |
| 8,055,822 B2* | 11/2011 | Bernstein et al. | 710/65 |
| 8,064,605 B2* | 11/2011 | Brutch et al. | 380/277 |
| 8,065,517 B2* | 11/2011 | Cizas et al. | 713/156 |
| 8,074,262 B2* | 12/2011 | Scarlata | 726/4 |
| 8,095,600 B2* | 1/2012 | Hasha et al. | 709/206 |
| 8,095,601 B2* | 1/2012 | Hasha et al. | 709/206 |
| 8,229,458 B2* | 7/2012 | Busch | 455/456.1 |
| 8,239,433 B2* | 8/2012 | Park et al. | 708/271 |
| 8,250,398 B2* | 8/2012 | Solomon et al. | 713/400 |
| 8,330,598 B2* | 12/2012 | Szucs | 340/540 |
| 8,341,728 B2* | 12/2012 | Kaihoko et al. | 726/16 |
| 8,364,171 B2* | 1/2013 | Busch | 455/456.1 |
| 8,437,776 B2* | 5/2013 | Busch | 455/456.1 |
| 8,447,331 B2* | 5/2013 | Busch | 455/456.1 |
| 8,495,244 B2* | 7/2013 | Bonar et al. | 709/239 |
| 8,559,977 B2* | 10/2013 | Busch | 455/456.1 |
| 8,566,236 B2* | 10/2013 | Busch | 705/39 |
| 2002/0097878 A1 | 7/2002 | Ito et al. | 380/277 |
| 2002/0178370 A1* | 11/2002 | Gurevich et al. | 713/189 |
| 2003/0099360 A1 | 5/2003 | Hoang | 380/277 |
| 2004/0181327 A1* | 9/2004 | Tsosie | 701/36 |
| 2005/0132367 A1 | 6/2005 | Tewari et al. | |
| 2006/0106806 A1 | 5/2006 | Sperling et al. | 707/10 |
| 2006/0277414 A1* | 12/2006 | Kotani et al. | 713/189 |
| 2007/0118879 A1* | 5/2007 | Yeun | 726/3 |
| 2007/0250717 A1* | 10/2007 | Kumagai et al. | 713/176 |
| 2007/0300220 A1 | 12/2007 | Seliger et al. | |
| 2007/0300221 A1 | 12/2007 | Hartz et al. | |
| 2008/0009345 A1* | 1/2008 | Bailey et al. | 463/29 |
| 2008/0148411 A1 | 6/2008 | Murakami | 726/26 |
| 2008/0163209 A1 | 7/2008 | Rozas et al. | 718/1 |
| 2008/0209409 A1 | 8/2008 | Van Riel et al. | 717/168 |
| 2008/0209415 A1 | 8/2008 | Van Riel et al. | 718/1 |
| 2008/0222734 A1* | 9/2008 | Redlich et al. | 726/26 |
| 2008/0248815 A1 | 10/2008 | Busch | |
| 2008/0256320 A1 | 10/2008 | Hartwich et al. | |
| 2008/0276301 A1 | 11/2008 | Nataraja et al. | 726/3 |
| 2008/0284470 A1* | 11/2008 | Park et al. | 327/105 |
| 2009/0055826 A1* | 2/2009 | Bernstein et al. | 718/102 |
| 2009/0077630 A1* | 3/2009 | Kaihoko et al. | 726/2 |
| 2009/0113413 A1 | 4/2009 | Reinz | 717/173 |
| 2009/0164994 A1 | 6/2009 | Vasilevsky et al. | 718/1 |
| 2009/0217244 A1 | 8/2009 | Bozak et al. | 717/124 |
| 2009/0241109 A1 | 9/2009 | Vandegrift et al. | 718/1 |
| 2009/0254572 A1* | 10/2009 | Redlich et al. | 707/10 |
| 2009/0288084 A1 | 11/2009 | Astete et al. | |
| 2009/0300254 A1 | 12/2009 | Newald et al. | |
| 2009/0313032 A1* | 12/2009 | Hafner et al. | 705/1 |
| 2010/0070963 A1 | 3/2010 | Bae et al. | 717/171 |
| 2010/0124196 A1* | 5/2010 | Bonar et al. | 370/329 |
| 2010/0161922 A1* | 6/2010 | Sharp et al. | 711/162 |
| 2010/0211305 A1 | 8/2010 | Miyata | |
| 2010/0301809 A1 | 12/2010 | Bhade et al. | 320/148 |

FOREIGN PATENT DOCUMENTS

| | | | |
|---|---|---|---|
| CN | 101621377 A | 1/2010 | |
| EP | 1 195 965 | 4/2002 | H04L 29/06 |
| GB | 2 423 168 | 8/2006 | G06F 9/46 |
| JP | 2009-110224 | 5/2009 | G08G 1/00 |
| JP | 2009-129262 | 6/2009 | G06Q 50/00 |
| JP | 2009-217395 | 9/2009 | G06F 9/445 |
| JP | 2009217395 A * | 9/2009 | |
| JP | 2009-254052 | 10/2009 | B60L 11/18 |
| JP | 2010-061237 | 3/2010 | G07B 15/00 |
| JP | 2010-149553 | 7/2010 | B60R 16/02 |
| JP | 2010-190792 | 9/2010 | G01C 21/00 |
| WO | WO 03/098868 | 11/2003 | H04L 9/08 |
| WO | WO 2009/001447 | 12/2008 | G06F 21/20 |
| WO | WO 2009/122530 | 10/2009 | G06F 21/20 |

OTHER PUBLICATIONS

Stic search results dated May 20, 2014.*

Berger et al.; "TVDc: Managing Security in the Trusted Vit=rtual Datacenter"; ACM SIGOPS Operating Systems Review; XP002636435; pp. 40-47, 2008.

van Cleeff et al.; "Security Implications of Virtualization: A literature Studt"; 2009 International Conference on Computational Science and Engineering; pp. 353-358, 2009.

Nilsson et al.; "A Framework for Self-Verification of Firmware Updates over the Air in Vehicle ECUs"; 2008 IEEE GLOBECOM Workshops; XP031405600; pp. 1-5, 2008.

International Search Report and Written Opinion; PCT/US2011/026575; pp. 14, May 26, 2011.

International Search Report and Written Opinion; PCT/US2011/026576; pp. 13, Jun. 6, 2011.

International Search Report and Written Opinion; PCT/US2011/026577; pp. 13, Jun. 9, 2011.

"More Secure Computing", Trusted Computing Group, www.trustedcomputinggroup.org, 5 pages, Nov. 2006.

"Trusted Computing Group", Trusted Computing Group—Wikipedia, the free encyclopedia, http://en.wikipedia.org/wiki/Trusted_Computing_Group, 8 pages, Printed Jun. 14, 2011.

"Trusted Network Connect", Trusted Network Connect—Wikipedia, the free encyclopedia, http://en.wikipedia.org/wiki/Trusted_Network_Connect, 4 pages, Printed Jun. 14, 2011.

"Trusted Platform Module", Trusted Platform Module—Wikipedia, the free encyclopedia, http://en.wikipedia.org/wiki/Trusted_Platform_Module, 6 pages, Printed Jun. 14, 2011.

International Search Report and Written Opinion; PCT/US2011/026573; pp. 15, Jul. 1, 2011.

Makowitz et al.; "FlexRay—A Communication Network for Automotive Control Systems"; IEEE Computer Society; pp. 207-212, 2006.

Chinese Office Action and English translation; Application No. 201110276927.4; pp. 8, Jan. 6, 2014.

Japanese Office Action with English translation; Application No. 2013-501278; pp. 4, Dec. 3, 2013.

Japanese Office Action with English translation; Application No. 2013-501279; pp. 4, Dec. 3, 2013.

Chinese Office Action and English translation; Application No. 201110276927.4; pp. 15, Sep. 2, 2014.

Chinese Office Action and English translation; Application No. 201180015119.0; pp. 14, Jun. 5, 2014.

Chinese Office Action and English translation; Application No. 201180014465.7; pp. 25, Jun. 27, 2014.

United States Office Action; U.S. Appl. No. 12/879,226; pp. 9, Jun. 24, 2014.

Chinese Office Action issued in Patent Appl. No. 201180014465.7; 22 pages with English translation, Mar. 18, 2015.

Chinese Office Action issued in Patent Appl. No. 201110276927.4; 19 pages with English Translation, Mar. 13, 2015.

Chinese Office Action issued in Patent Application No. 201180015119.0, With English Translation, 15 pages, Feb. 16, 2015.

(56) References Cited

OTHER PUBLICATIONS

Japanese Office Action issued in Patent Application No. 2011-196651, With English Translation, 5 pages, Jan. 27, 2015.
Chinese Office Action issued in Chinese Patent Application No. 201180014937.9, With English Translation, 20 pages, Dec. 3, 2014.
European Office Action; Application No. 11 707 967.3; 4 pages, Nov. 4, 2014.
European Office Action; Application No. 11 708 365.9; 5 pages, Nov. 4, 2014.
FlexRay Consortium, Requirements Specification Version 2.1, Dec. 19, 2005.
Chinese Office Action issued in Patent Appl. No. 201180014937.9; 6 pages with English translation, Jun. 12, 2015.
Japanese Office Action issued in Patent Appl. No. 2011-196651; 6 pages with English translation, Aug. 25, 2015.

* cited by examiner

USING TRUST POINTS TO PROVIDE SERVICES

RELATED APPLICATION

This application claims the benefit of U.S. Provisional Application No. 61/316,498, titled "REMOTE MAINTENANCE", filed on 23 Mar. 2010, which is incorporated herein in its entirety.

This application is a continuation-in-part of U.S. patent application Ser. No. 12/879,226, titled "System and Methods for Remote Maintenance In An Electronic Network With Multiple Clients," filed 10 Sep. 2010, which is incorporated herein in its entirety.

TECHNICAL FIELD

This invention relates generally to information exchange and more specifically to using trust points to provide services.

BACKGROUND

Services provided to a client may require sending confidential information through communication networks. For example, a client may send a request for a service to a service provider, which in turn may request payment information from the client. The sender of confidential information may want to authenticate the receiver before sending the information.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 10 of the drawings, like numerals being used for like and corresponding parts of the various drawings.

Overview

In accordance with the present invention, disadvantages and problems associated with previous techniques for providing services may be reduced or eliminated.

In certain embodiments, processors may operate to establish trust with trust point systems by performing a user authentication, a platform authentication, and an environment authentication. The processors may communicate information with the trust point systems in response to establishing trust. In certain embodiments, the trust point systems may cooperate to provide a variety of services, such as escorting, battery charging, vehicle security, and/or emissions reporting services.

Certain embodiments of the invention may provide one or more technical advantages. A technical advantage of one embodiment may be that a mobile device may include a trust point system that may allow the mobile device to more efficiently receive services. Another technical advantage of one embodiment may be that trust point systems may cooperate to provide a variety of services, such as escorting, battery charging, vehicle security, and/or emissions reporting services.

Certain embodiments of the invention may include none, some, or all of the above technical advantages. One or more other technical advantages may be readily apparent to one skilled in the art from the figures, descriptions, and claims included herein.

Figure 1:
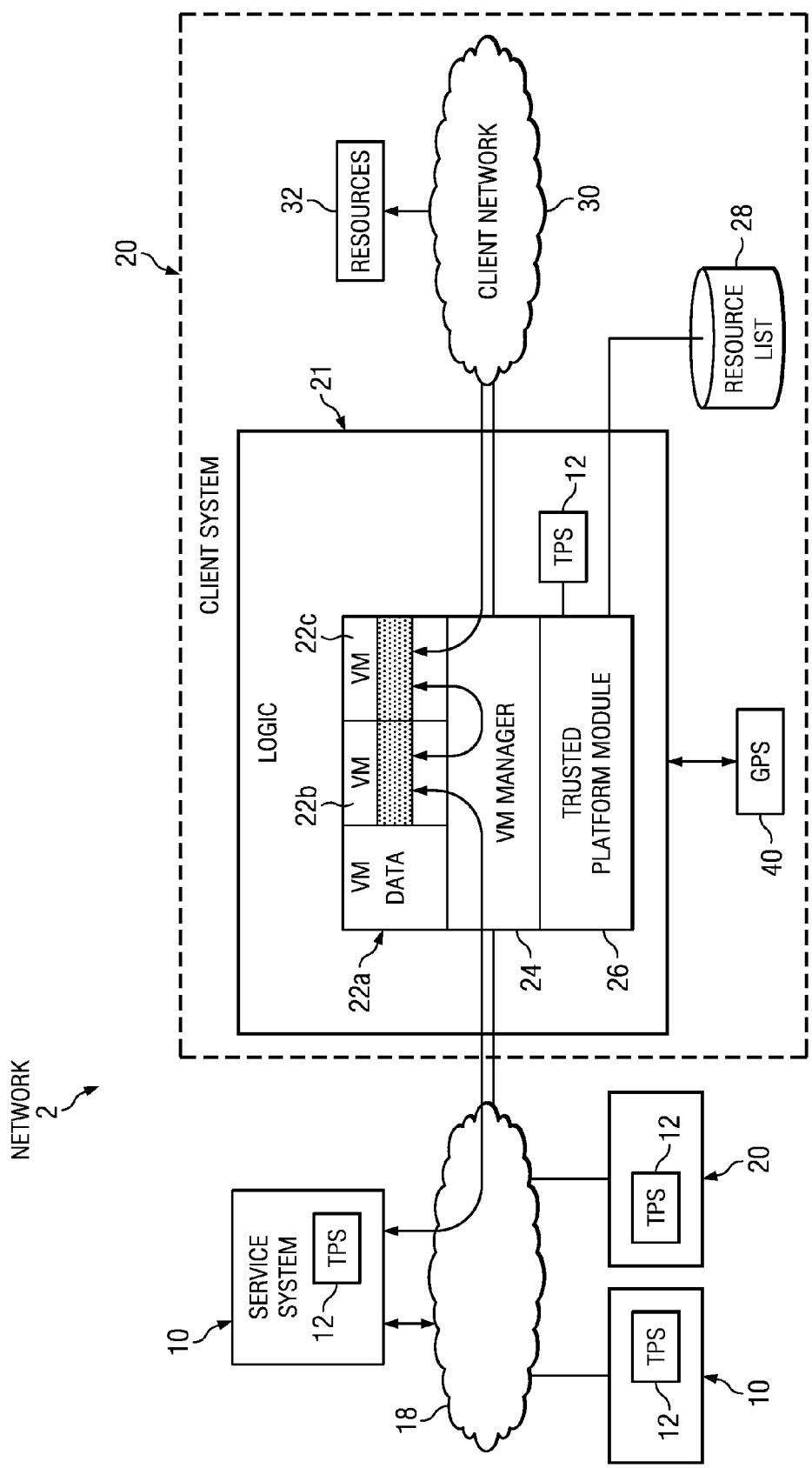
FIG. 1 illustrates an example of a network in which one or more service systems provide a service to one or more client systems.

FIG. 1 illustrates an example of a network 2 in which one or more service systems 10 provide a service to one or more client systems 20. Systems 10 and 20 may include trust point systems 12 that may be used to establish trust among systems 10 and 12. In certain embodiments, a mobile device may include a trust point system 12 that may allow the mobile device to more efficiently participate in providing services. In certain embodiments, trust point systems 12 may cooperate to provide a variety of services, such as escorting, battery charging, vehicle security, and/or emissions reporting services.

In the illustrated example, network 2 includes one or more service systems 10 coupled to one or more client systems 20 through a communication network 18. Service system 10 may provide one or more services to one or more client systems 20. Examples of services include escorting, battery charging, vehicle security, and/or emissions reporting services. Another example of a service includes managing software and/or firmware updates and/or status.

Examples of service systems 10 include vehicle service centers, traffic information centers, charging systems, payment systems, and any other system that may provide services to a client system 20. A vehicle service center may be a center that facilitates providing services to vehicles. A traffic information center may include a center that has realtime traffic information that may be used to plan driving routes. A charging system may be a system that can charge a power supply (for example, a battery) of a client system 20 (for example, a vehicle). A payment system may be a system that can authorize payment for service. Examples of a payment system may include a bank, a credit card company, a credit agency, a business, or other suitable organization that can authorize payment of a service.

Service system 10 may include features that allow service system 10 to communicate securely with other entities. For example, service system 10 may include a trust point system 12 that establishes trust with other entities. Trust point systems 12 are described in more detail below. As another example, service system 10 may include a server that manages security policies used to authenticate other entities. The policies may define a set of attribute values that must be met before a client system 20 is granted permission to access a service.

Client system 20 may receive services from a service system 10. Examples of client systems 20 include computers, mobile devices, and vehicles, which may be referred to as computer client systems, mobile client systems, and vehicle client systems, respectively.

A computer may be any computing device such as server, laptop, or desktop computer. A mobile device may be a handheld device that can communicate wirelessly. Examples of mobile devices include telephones (such as cellular, mobile, or smart), digital assistants (such as personal or enterprise), and gaming devices. A vehicle may be a device designed to transport people and/or cargo. Examples of vehicles include land transport (such as automobiles, trains, bicycles, and motorcycles), watercraft (such as boats and ships), and aircraft (such as airplanes). In certain embodiments, a vehicle may include transceivers that allow for wireless communication. Communication network 18 is described in more detail below.

One or more service systems 10 and/or one or more client systems 20 may include a trust point system 12 (or trust point). In certain embodiments, trust point system 12 may establish trust with one or more other trust point systems 12 by performing a user authentication, a platform authentication, and/or an environment authentication in order to communicate information with the other trust point systems 12. The authentication may also involve performing authorization for a service and/or performing accounting for use of the service.

In certain embodiments, establishing trust may include sending trust point information from a first trust point system to a second trust point system to allow the second trust point system to authenticate the first trust point system. In the embodiments, establishing trust may include receiving trust point information from a trust point system and authenticating the trust point system using the trust point information. Trust point information may include information that can be used to authenticate a trust point system. Examples of trust point information are described in more detail with reference to FIG. 2. Trusted Computing and TrustCube are examples of systems and methods that may provide certifiable reporting among trust point systems 12.

In certain embodiments, client system 20 may also include one or more virtual machines (VMs) 22, a virtual machine manager (VMM) 24, a trusted platform module (TPM) 26, a resource list 28, a client network system 30, resources 32, and a GPS receiver 40.

Trusted platform module 26 may generate trust point information that may be used to authenticate module 26. In certain embodiments, trusted platform module (TPM) 26 may operate with trust point system 12. In certain embodiments, trusted platform module 26 includes at least one processor with a unique Rivest, Shamir, and Adleman (RSA) key that may be burned into the processor. The RSA key may be used to authenticate client system 20 of trusted platform module 26. In certain embodiments, trusted platform module 26 may generate cryptographic keys using, for example, a pseudo-random number generator.

In certain embodiments, virtual machine 22 may correspond to client network system 30 and/or a process associated with client network system 30. For example, a virtual machine 22 may be used to incorporate a sensor. One or more virtual machines 22 may run one or more operating systems (OSs). In certain embodiments, virtual machine 22 may use a single-purpose operating system and share processing resources of client system 20 through virtual machine 24.

A virtual machine manager (VMM) 24 may create, run, monitor, and/or terminate virtual machines 22. Virtual machine manager 24 may intercept interrupts and/or faults between virtual machines 22 and/or control the access that an application has to hardware and/or software. Virtual machine manager 24 may also manage multi-tasking for a processor by sharing time between various threads in which applications and/or virtual machines 22 run. Virtual machine manager 24 may manage communications among virtual machines 22.

Resource list 28 may include a whitelist of entities approved for access and/or a blacklist of entities for which access will be denied.

Client network 30 may be a network within a client system 20 that facilitates cooperation among the components of client system 20. For example, client network 30 may be a network (such as a FlexRay network) that manages processors in a vehicle. As another example, a controller-area network (CAN or CAN-bus) allows microcontrollers and devices to communicate with each other without a host computer. Additional examples include time triggered protocol (TTP) and avionics full-duplex switched Ethernet (AFDX) networks.

Client network 30 may manage resources 32, such as resources of client system 20, for example, processors and/or their associated software, firmware, and/or processing instructions related to the processors. For example, a client network 30 may comprise central processing units (CPUs) that each use software and/or firmware for operation. Client network 30 may be responsible for the operation and/or maintenance of resources 32, including managing the version and/or update status of the software and/or firmware associated with each resources 32 in client system 20.

Global Positioning System (GPS) receiver 40 interfaces with a GPS navigation satellite system that provides location and time information.

Figure 2:
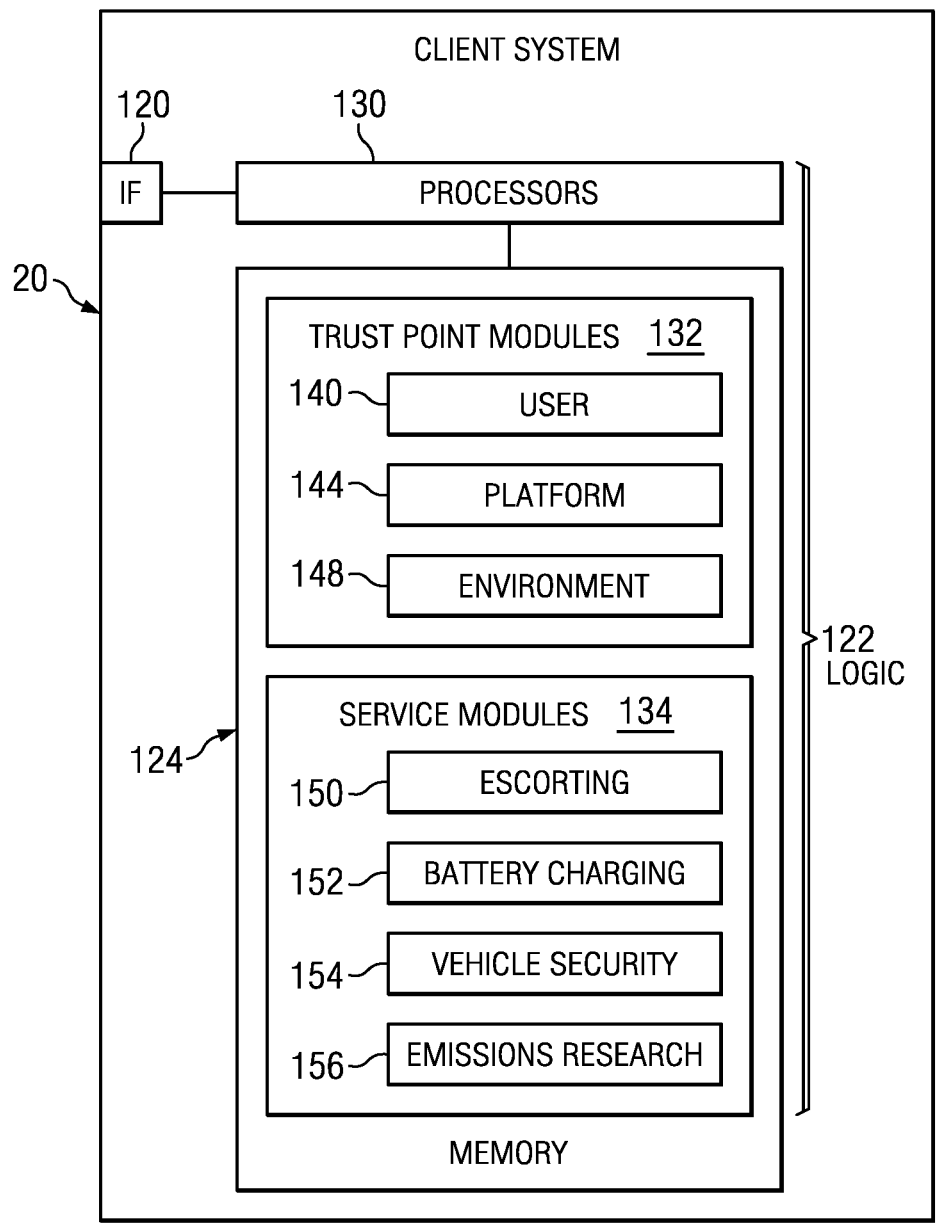
FIG. 2 illustrates an example of a client system.

FIG. 2 illustrates an example of a client system 20. Client system 20 may be a computer client system, a mobile client system, or a vehicle client system. In the illustrated example, client system includes an interface (IF) 120, logic 122, and one or more memories 124. Logic 122 may include one or more processors 130 and applications such as trust point modules 132 and service modules 134. Trust point modules 132 may include a user module 140, a platform module 144, and an environment module 148. Service modules 134 may include an escorting module 150, a battery charging module 152, a vehicle security module 154, and an emissions reporting module 156.

Trust point modules 132 may be used to establish trust with other trust point systems. Trust point modules 132 may perform authentication to establish trust. As discussed previously, authentication may also involve authorization and/or accounting. Trust point modules 132 may perform user authentication, platform authentication, and/or environment authentication.

Trust point modules 132 may use trust point information to perform authentication. Examples of trust point information include user, device, and environment information, described in more detail below. Trust point modules 132 may check to see that the information satisfies requirements to determine whether a trust point is acceptable. For example, a trust point may be acceptable if it is on a whitelist or not on a blacklist. If the trust point is acceptable, the trust point may be allowed access to a service and/or may continue to communicate with an entity.

User authentication module 140 performs user authentication to authenticate a user. User authentication module 140 may use user information to authenticate a user. User information pertains to the particular user and may be entered by the user. User information may include identifiers (such as usernames and passcodes) and biometric information (such as physiological or behavioral information). Physiological information is related to a feature of the body. Examples include fingerprints, palm prints, hand features, facial features, DNA, iris or retinal scans, and odor. Behavioral information is related to the behavior of a person. Examples include typing rhythm, gait, and voice.

Platform module 144 performs platform authentication to authenticate a platform. Platform module 144 may use device information provided by the platform to perform the authentication. Device information may include an identifier (such as a registration identifier (ID)), a network address (such as an Internet Protocol (IP) address), a machine address (such as an Media Access Control (MAC) address), a certification (such as a Public Key Infrastructure (PKI) certification), and/or other identifier that identifies the device.

Environment module 148 performs platform environment authentication to authenticate the platform environment. Environment module 148 may use environment information to perform the authentication. Environment information may include software information (such as software version and/or state) of software running on the platform, hardware information (such as hardware version and hardware configuration), and peripheral information (such as a peripheral identifier) of peripherals managed by the platform.

Service modules 134 facilitate services provided to client systems 20. In the example, the services include escorting, battery charging, vehicle security, and emissions reporting services. Any suitable number of any suitable services, however, may be provided.

Escorting module 150 performs an escorting process that obtains a route planned according to a task list and then instructs a vehicle to move along the route. In certain embodiments, an escorting process may include establishing, by a vehicle trust point system of a vehicle, trust with a mobile trust point system. A task list comprising tasks is received from the mobile trust point system. Trust is established with a service trust point system, and a route for the tasks is obtained from the service trust point system. The vehicle is instructed to move along the route. An example of an escorting process is described in more detail with reference to FIG. 3.

Battery charging module 152 performs a battery charging process that allows a battery charging system to charge a battery of a vehicle. In certain embodiments, a battery charging process may include authenticating, by a vehicle trust point system of a vehicle, a charging trust point system. Vehicle trust point information is sent to allow the charging trust point system authenticate the vehicle trust point system. Battery information of a battery of the vehicle is sent to the charging trust point system. Payment information corresponding to the vehicle is sent to the charging trust point system to allow the charging trust point system to charge the battery. An example of a battery charging process is described in more detail with reference to FIGS. 4 through 8.

Vehicle security module 154 performs a vehicle security process that sends a recording made in response to a security trigger event to one or more trust point systems. In certain embodiments of a vehicle security process, a vehicle trust point system of a vehicle in a vehicle environment may sense a security trigger event. The vehicle environment is recorded in response to the security trigger event to yield a recording. The recording is sent to a trust point system to allow the trust point system to send the recording to a mobile trust point system. The trust point system may also store the recording in a database. An example of a vehicle security process is described in more detail with reference to FIG. 9.

Emissions reporting module 156 performs an emissions reporting process that gathers driving data of a vehicle used to calculate emissions of the vehicle. In certain embodiments, an emissions reporting process may include gathering, by a vehicle trust point system of a vehicle, driving data. The driving data is sent to a center trust point system to allow the center trust point system to calculate one or more emissions values of the vehicle. An example of an emissions reporting process is described in more detail with reference to FIG. 10.

FIGS. 3 through 10 illustrate examples of methods for services. In the examples, client systems 20 may include a mobile device, a vehicle, or other client system. Service systems 10 may include a vehicle service center, a traffic information center, a charging system, or other service system. In the example, each system 10 and 20 may have a trust point system (or trust point). The methods may be performed by a trust point and/or other components of the systems 10 and 20.

Figure 3A:
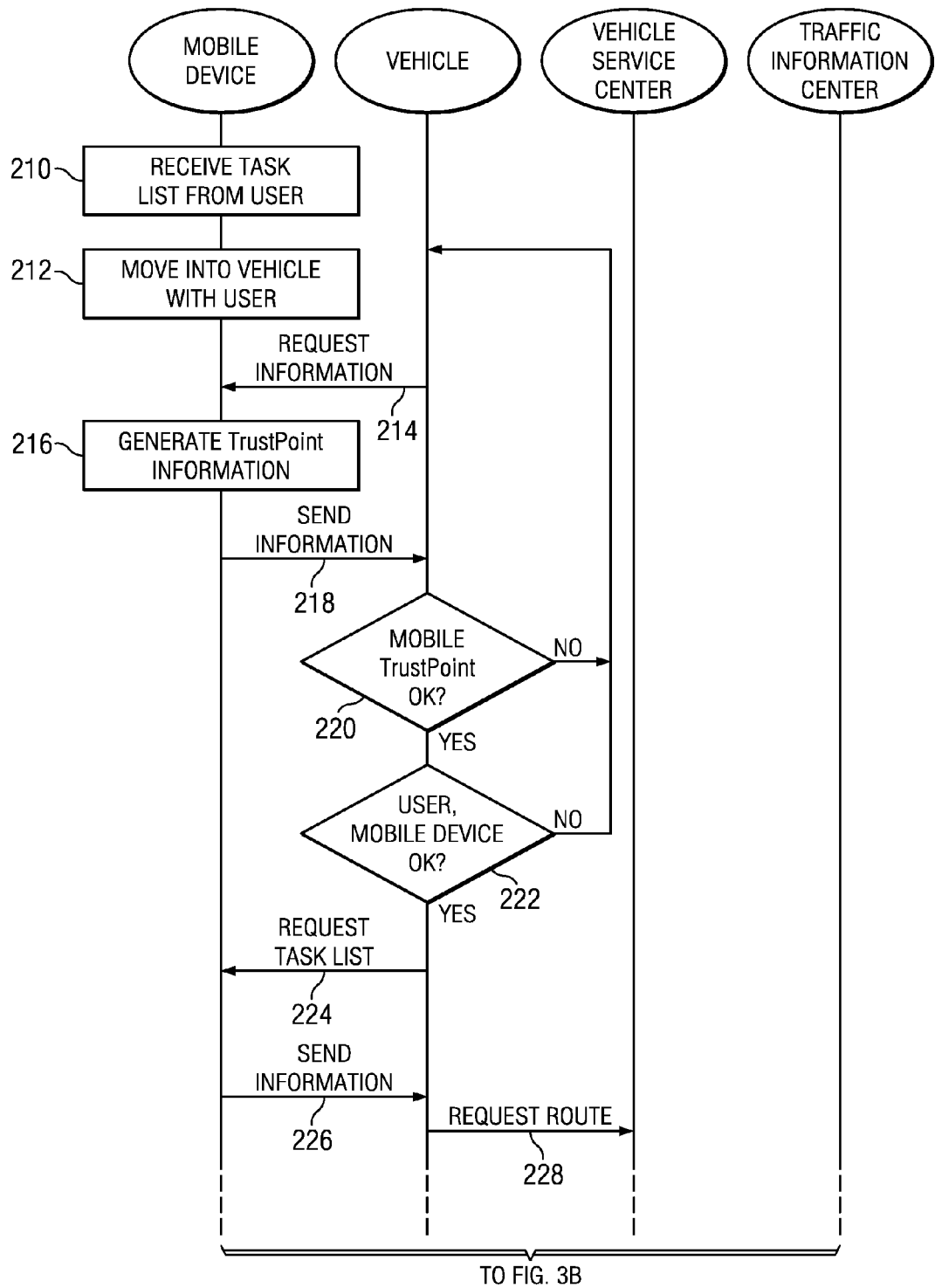
FIGS. 3A-3C illustrate an example of a method for providing an escorting service.
Figure 3B:
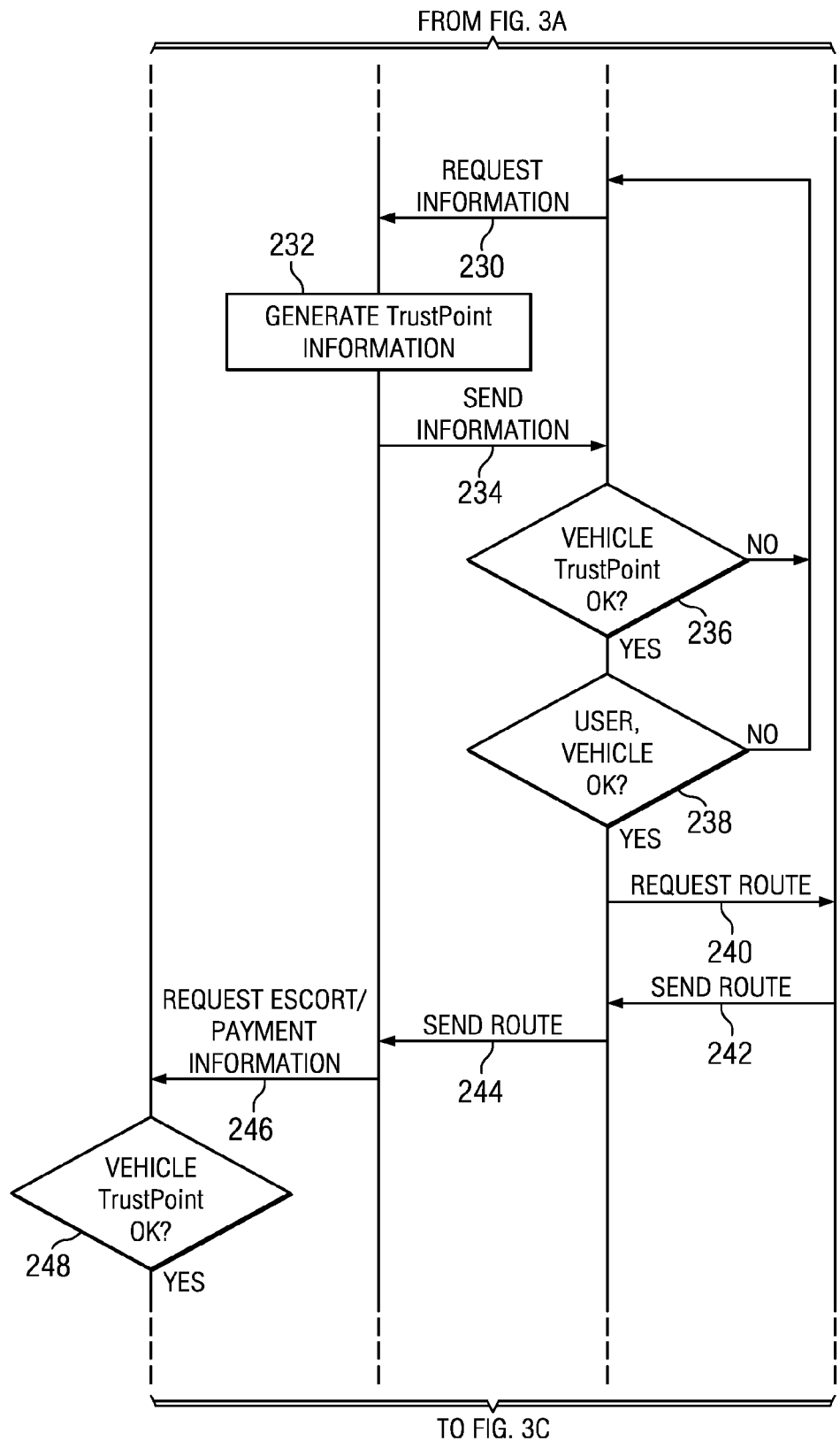
Figure 3C:
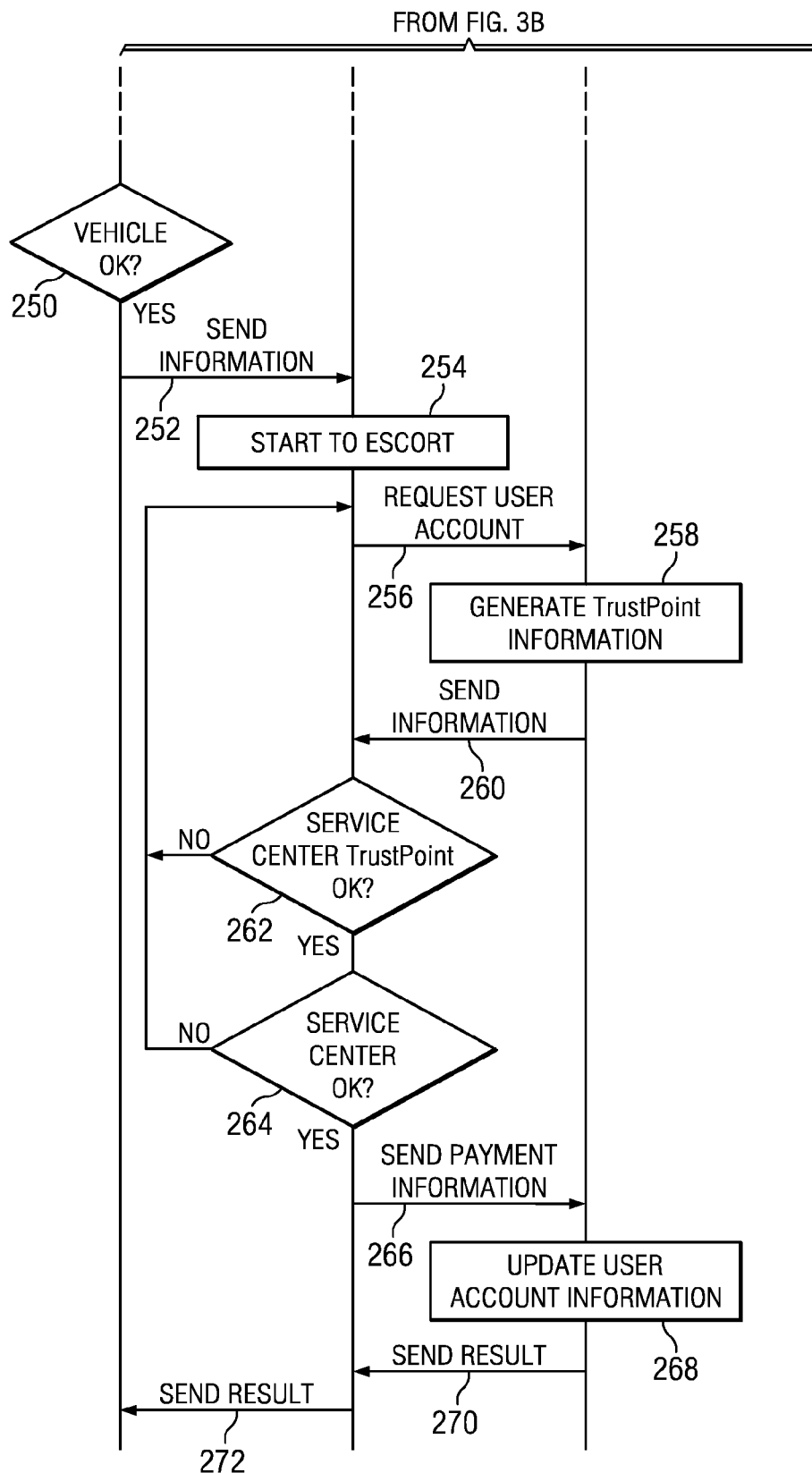

FIG. 3 illustrates an example of a method for providing an escorting service. In the example, the client systems 20 include a mobile device and a vehicle, and the service systems 10 include a vehicle service center and a traffic information center. The method may be performed by a trust point, such as the vehicle trust point.

A task list is received from a user at step 210. A task may include an action to be performed (such as go grocery shopping), a location (which may be expressed as an address), a business, or a type of location (such as grocery store). In certain embodiments, the user may enter the task list into the mobile device. This may allow the user to enter the tasks list at the user's convenience, such as while not driving. The mobile device moves into the vehicle with the user at step 212. The vehicle may detect that someone has entered the vehicle and may request that the user provide user identification.

Steps 214 through 222 may be performed to establish trust between the mobile trust point and the vehicle trust point. Information is requested at step 214. In certain embodiments, the request may ask for trust point information comprising user information obtained from the user and mobile trust point information provided by the mobile device. The mobile trust point generates the trust point information at step 216.

Information is received at step 218. The vehicle trust point checks whether the mobile trust point is acceptable at step 220. The trust point may be checked by performing user, platform, and/or environment authentication. If the mobile trust point is not acceptable, the method returns to step 214 to request information again. If the mobile trust point is acceptable, the method proceeds to step 222, where the vehicle checks whether the user and mobile device are acceptable according to the user information and mobile trust point information. If the user and mobile device are not acceptable, the method returns to step 214 to request information again. If the user and mobile device are acceptable, the method proceeds to step 224.

The vehicle trust point requests the task list at step 224. The task list is received from the mobile trust point at step 226. The vehicle trust point requests a route from center trust point at step 228.

Steps 230 through 238 may be performed to establish trust between the center trust point and the vehicle trust point. Center trust point requests information at step 230 in order to authenticate the vehicle trust point. The vehicle trust point generates trust point information at step 232. The trust point information may include device information provided by the vehicle, user information, and/or mobile trust point information.

The trust point information is sent to the center trust point at step 234 to allow the center trust point to authenticate the vehicle trust point. The center trust point checks whether the vehicle trust point is acceptable at step 236. A trust point may be regarded as acceptable if the trust point information is acceptable. Information from an acceptable trust point may be regarded as trustworthy; information from an unacceptable trust point may be regarded as not trustworthy. If the vehicle trust point is not acceptable, the method returns to step 230, where center trust point requests information again. If the vehicle trust point is acceptable, the method proceeds to step 238.

The center trust point checks whether the user and the vehicle are acceptable at step 238. An entity may be regarded as acceptable according to a policy. A policy may designate what type of information is required from the entity in order to be acceptable. For example, a policy may designate what type of user information, device information, and/or environment information is required. If they are not, the method returns to step 230, where the center trust point requests information again. If they are acceptable, the method proceeds to step 240.

Steps 240 through 244 may be performed to obtain a route for the tasks. The center trust point sends a request for a route at step 240. The traffic information center sends the route at step 242. The route may be planned in accordance to real time traffic reports. For example, the route may be planned to avoid traffic congestion. The center trust point forwards the route to the vehicle trust point at step 244.

The vehicle trust point sends a request for payment information to the mobile trust point at step 246. The mobile trust point authenticates the vehicle trust point at steps 248 and 250. The mobile trust point sends the information at step 252.

The escorting is started at step 254. The escorting may be performed in any suitable manner. For example, one or more components of the vehicle may instruct the vehicle to move along the route or may instruct the user to move the vehicle along the route.

Steps 256 through 264 are performed to check the center trust point. The vehicle sends a request for the user account to the center trust point at step 256. The center trust point generates and sends trust point information at step 258. The trust point information is received at step 260. The vehicle checks the vehicle service center at steps 262 and 264.

Payment information is sent at step 266. The vehicle service center updates the user account at step 268 and sends the result to the vehicle trust point at step 270. The vehicle trust point forwards the result to the mobile trust point at step 272.

Figure 4:
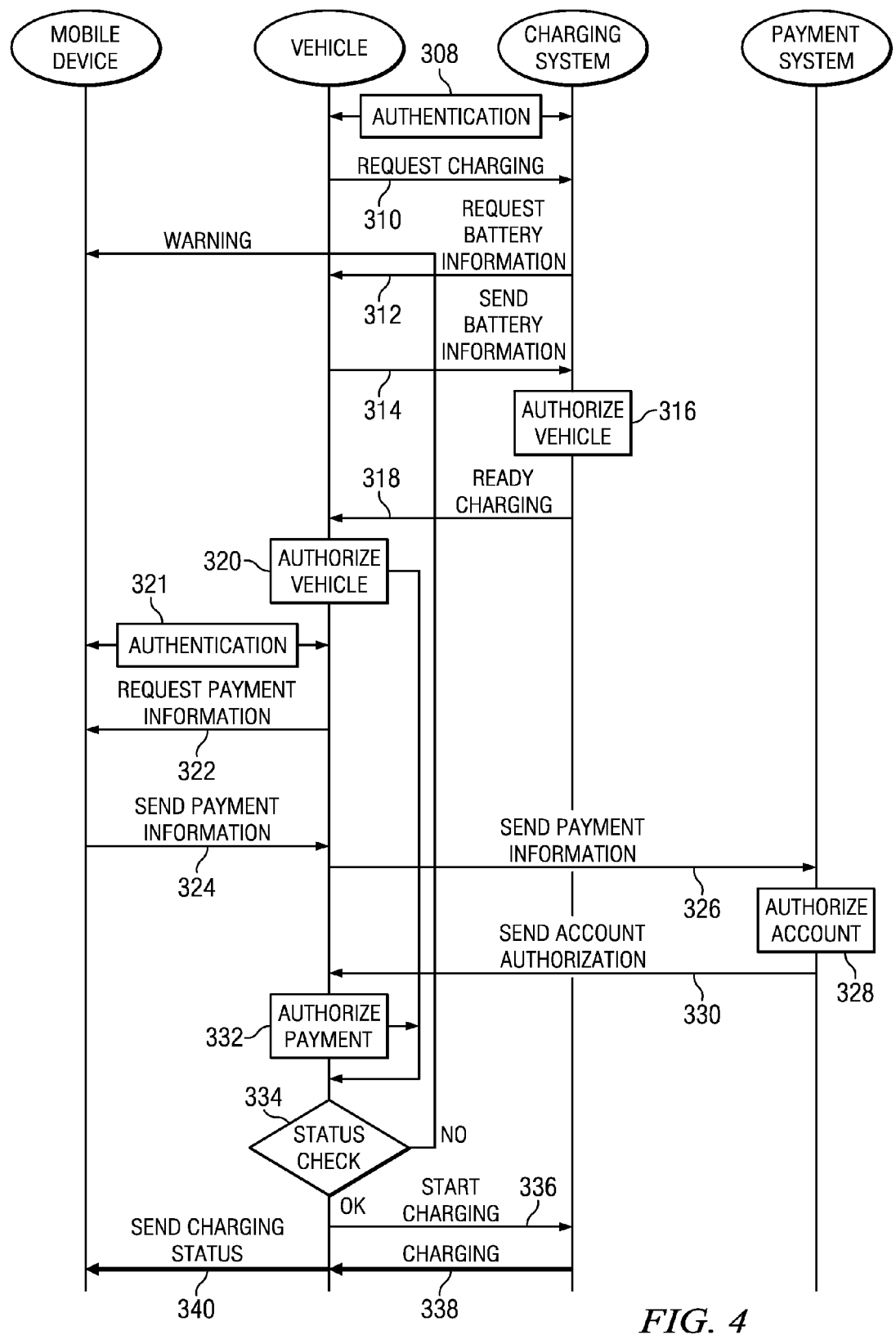
FIGS. 4, 5, 6, 7A-7C, and 8A-8B illustrate examples of methods for providing a battery charging service.

FIGS. 4 through 8 illustrate examples of methods for providing a battery charging service. FIG. 4 illustrates an overview of an example of a method for providing a battery charging service. In the example, the client systems 20 include a mobile device and a vehicle, and the service systems 10 include a charging system and a payment system. The method may be performed by a trust point, such as a vehicle trust point of the vehicle.

In certain embodiments, information to authorize payment for a service is sent from the mobile device instead of being stored in the vehicle. This may prevent an unauthorized person from taking the vehicle and obtaining services. In certain situations, users who obtain a service through a mobile trust point may be charged less than users who do not use a mobile trust point. In these situations, users who use a mobile trust point may cause fewer problems and be less risky. Accordingly, service providers may pay less insurance for trust point users and thus may be able to offer a service at a lower cost. Also, user may be encouraged to adopt the use of trust points if the cost is less.

In certain embodiments, authentication may be performed at step 308 to establish trust between a vehicle trust point and a charging trust point. In certain embodiments, authentication may include receiving charging trust point information at the vehicle trust point and authenticating the charging trust point using the charging trust point information. Authentication may also include sending vehicle trust point information to allow the charging trust point authenticate the vehicle trust point.

Any suitable trust point information may be used. The charging trust point information may include the charging system identifiers (such as servicer name and/or machine identifier) and system status (such as in operation or ready to charge). Vehicle trust point information may include, for example, device information and/or user information. Vehicle device information may include the vehicle description (such as make and/or model) and/or vehicle identification number.

The vehicle trust point requests charging at step 310. The charging trust point requests battery information at step 312. The battery information may include parameters describing the battery, for example, the voltage, make, model, current charge (such as x % capacity), capacity, vacancy, temperature, or other feature of the battery. The battery information is sent to the charging trust point at step 314.

The charging trust point authorizes the vehicle trust point at step 316. The charging trust point notifies the vehicle trust point that the charging system is ready to charge at step 318. The vehicle trust point authorizes the vehicle at step 320.

In certain embodiment, authentication may be performed at step 321 to establish trust between the vehicle trust point and a mobile trust point. In certain embodiment, authentication may include receiving mobile trust point information at the vehicle trust point and authenticating the mobile trust point using the mobile trust point information. Authentication may also include sending vehicle trust point information to allow the mobile trust point authenticate the vehicle trust point.

The vehicle trust point requests payment information for an account of the user from the mobile trust point at step 322. The payment information corresponding to the account is received from the mobile trust point at step 324. Payment information may include information that allows the account to be charged for a service. In certain embodiments, the mobile trust point may receive a key that allows the mobile trust point to encrypt the payment information.

The payment information is sent to the charging trust point or to a payment system at step 326 to allow the charging trust point to charge the battery. The charging trust point may forward the information to a payment system. The payment system authorizes the account at step 328 and sends the account authorization to the vehicle at step 330. The vehicle trust point authorizes payment at step 332.

The vehicle trust point performs a status check at step 334. The status check may involve determining that the vehicle was authorized and/or payment was authorized. The status check may involve determining that the vehicle cannot move during charging, for example, the vehicle is in park and the brake is set. If the status check fails, a warning is sent to the mobile trust point. If the status check passes, the vehicle trust point sends a request to start charging at step 336.

The charging system starts to charge the vehicle at step 338. The charging status is sent to the mobile trust point at step 340. The charging status may indicate a charge of the battery and a time remaining to charge the battery. The mobile device may display the charging status. In certain embodiments, the charging system may collaborate with a smart meter connected to an energy source (such as an electricity meter or a solar panel collector). The smart meter may be able to assess charging parameters such as charging time.

Figure 5:
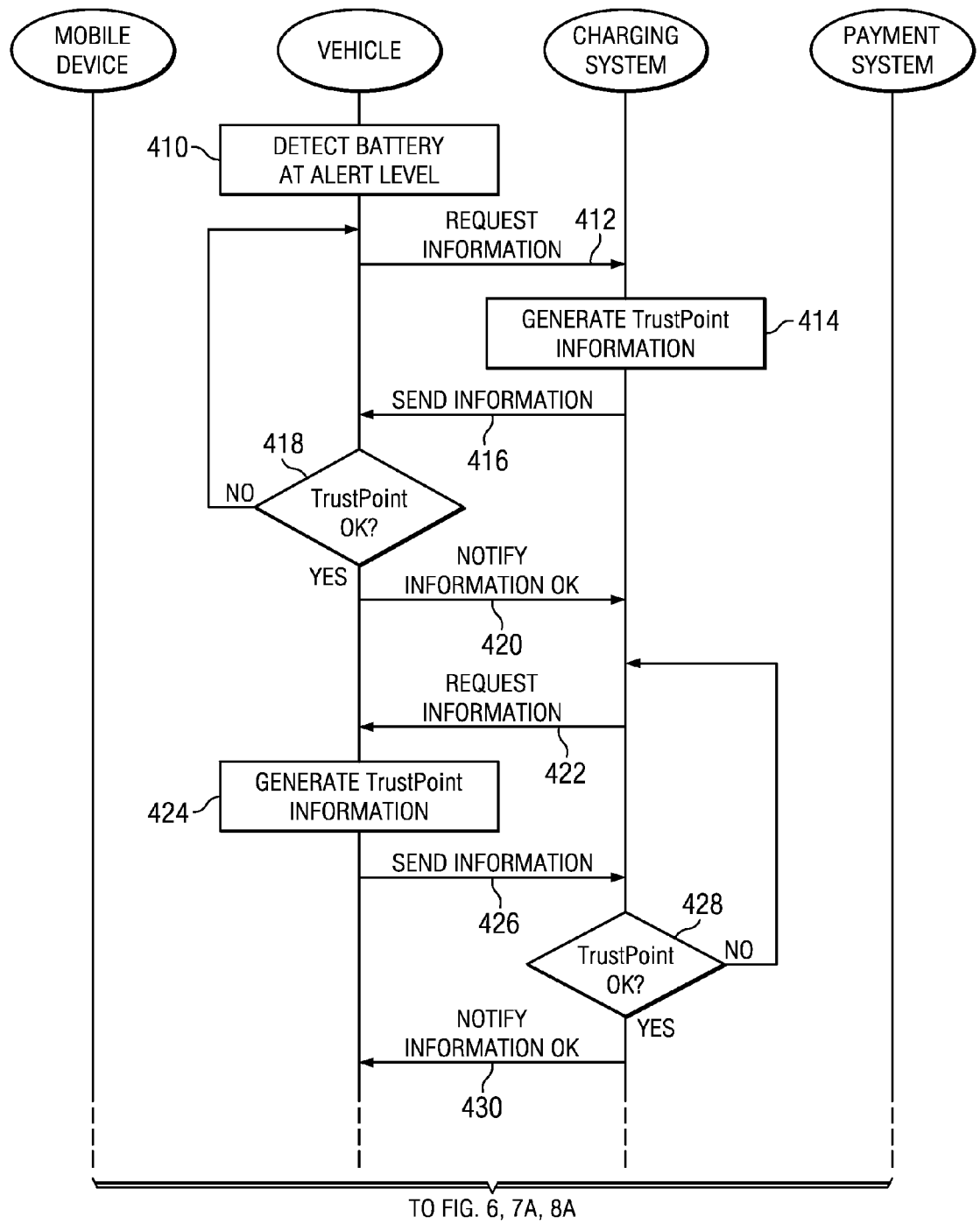

FIG. 5 illustrates an example of a method for mutual authentication between the vehicle trust point and the charging trust point. The vehicle detects that a battery is at an alert level at step 410. An alert level may be a level at which the battery should be charged, for example, a level in the range of less than 10, 10 to 25, or 25 to 50 percent charge.

The vehicle trust point requests information from the charging trust point at step 412. The charging trust point generates trust point information at step 414, and sends the information to the vehicle trust point at step 416. The vehicle trust point determines whether the charging trust point is acceptable at step 418. If the charging trust point is not acceptable, the method returns to step 412, where the vehicle requests information again. If the charging trust point is acceptable, the method proceeds to step 420, where the vehicle trust point notifies the charging trust point that the charging trust point is acceptable.

The charging trust point requests information from the vehicle trust point at step 422. The vehicle trust point generates the trust point information at step 424 and sends the information at step 426. The charging trust point determines whether the vehicle trust point is acceptable at step 428. If the vehicle trust point is not acceptable, the method returns to step 422 to request information again. If the vehicle trust point is acceptable, the method proceeds to step 430 to notify the vehicle trust point that the vehicle trust point is acceptable. The method may continue with FIG. 6, 7, or 8.

Figure 6:
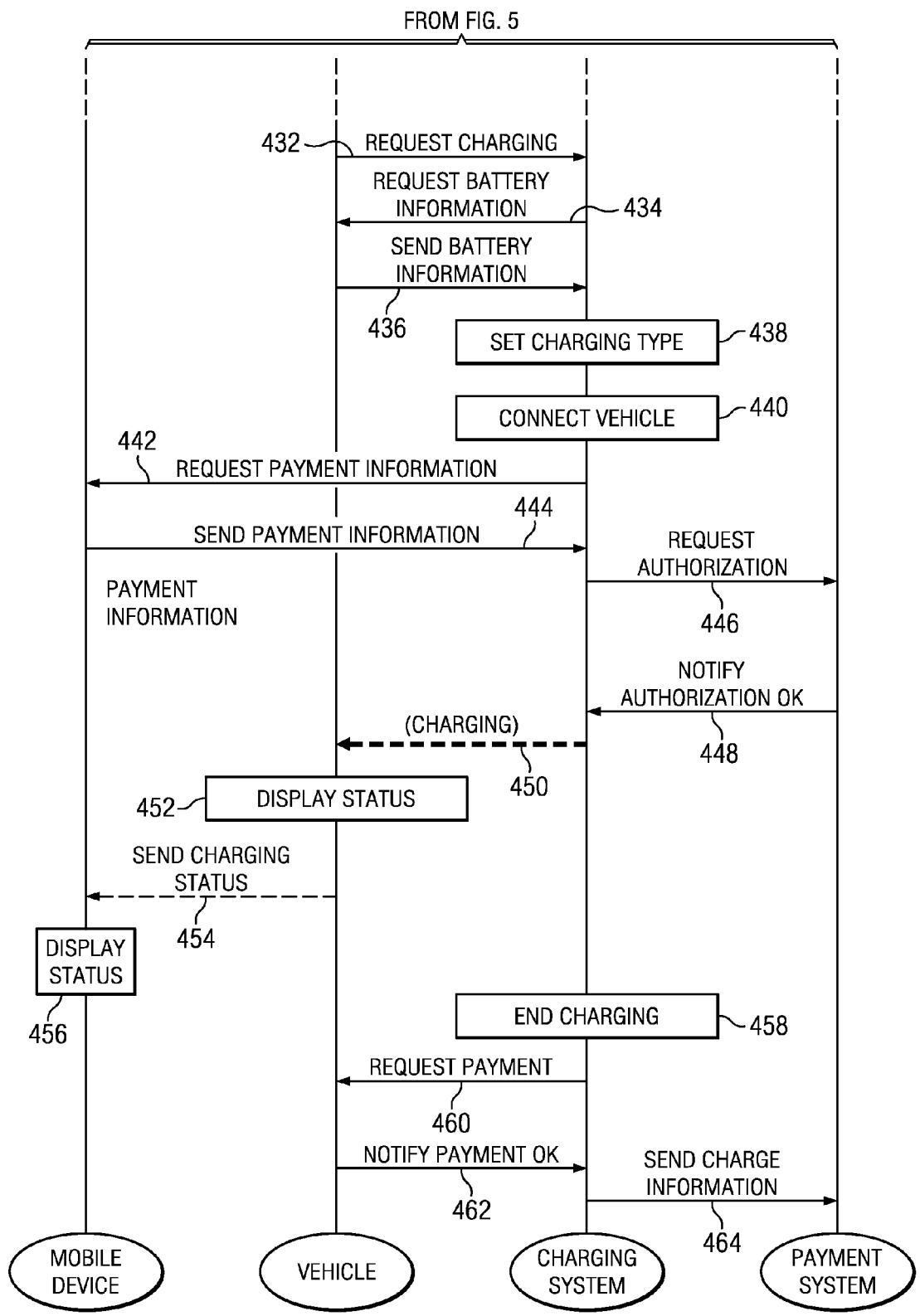

FIG. 6 illustrates an example of a method for charging the battery of the vehicle. The vehicle trust point requests charging from the charging trust point at step 432. The charging trust point requests battery information at step 434. The vehicle trust point sends the battery information at step 436. The charging trust point sets the charging type at step 438. The charging type may include the amount of charge to be provided to the battery that was described by the battery information. The charging stand is connected to the vehicle at step 440.

The charging trust point requests payment information and the vehicle trust point forwards the request to the mobile trust point at step 442. The mobile trust point sends the payment information to the vehicle trust point, which forwards the information at step 444. The charging trust point requests authorization for the payment at step 446. The payment system notifies the charging trust point that payment is authorized at step 448.

The charging stand charges the battery of the vehicle at step 450. The vehicle displays the status of the charging at step 452. The vehicle sends the charging status to the mobile device at step 454, and the mobile device displays the status at step 456. The charging ends at step 458. The charging trust point requests payment at step 460, and the vehicle trust point notifies authorizes payment at step 462. The charging trust point then sends the charging information to step 464.

Figure 7A:
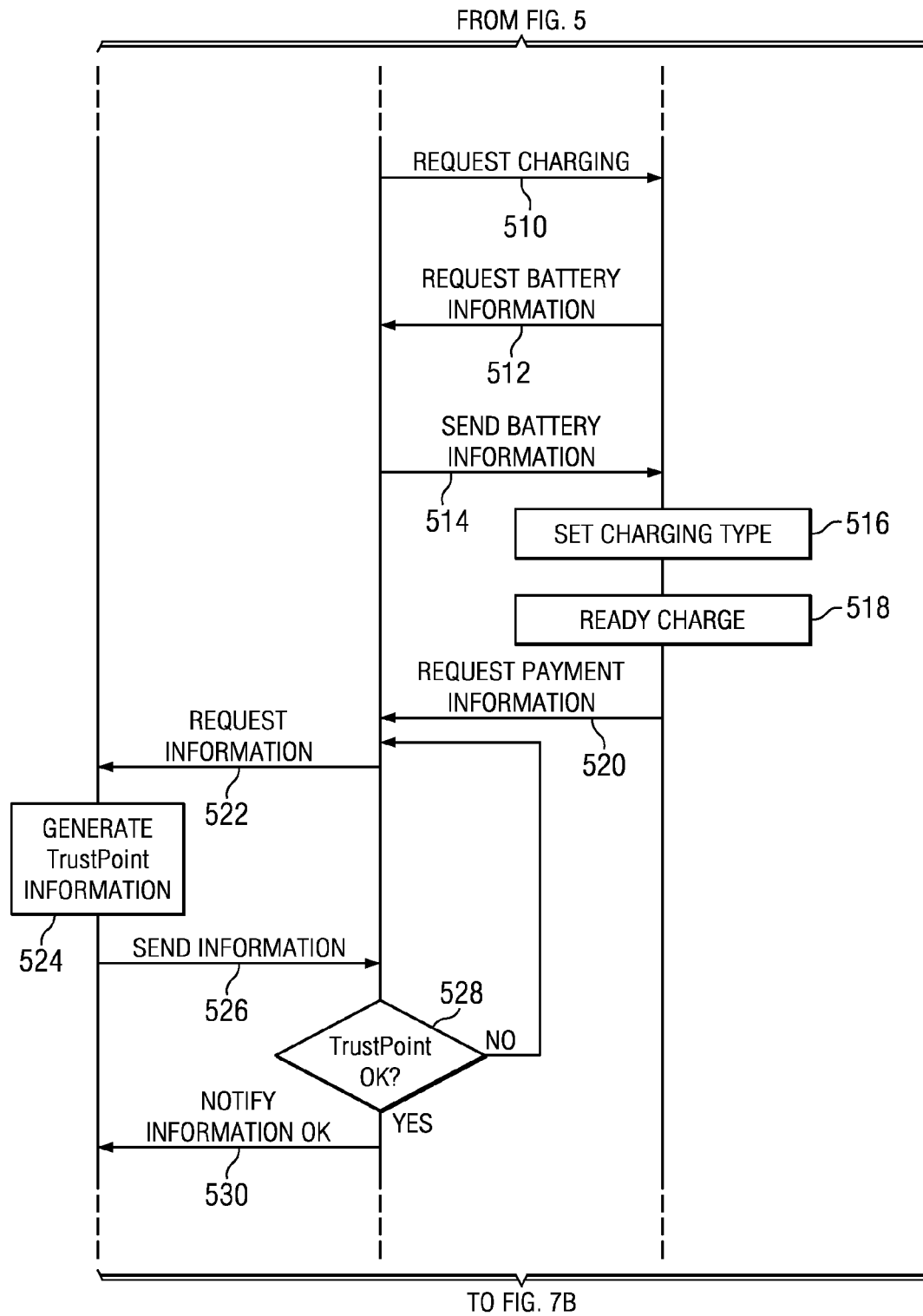
Figure 7B:
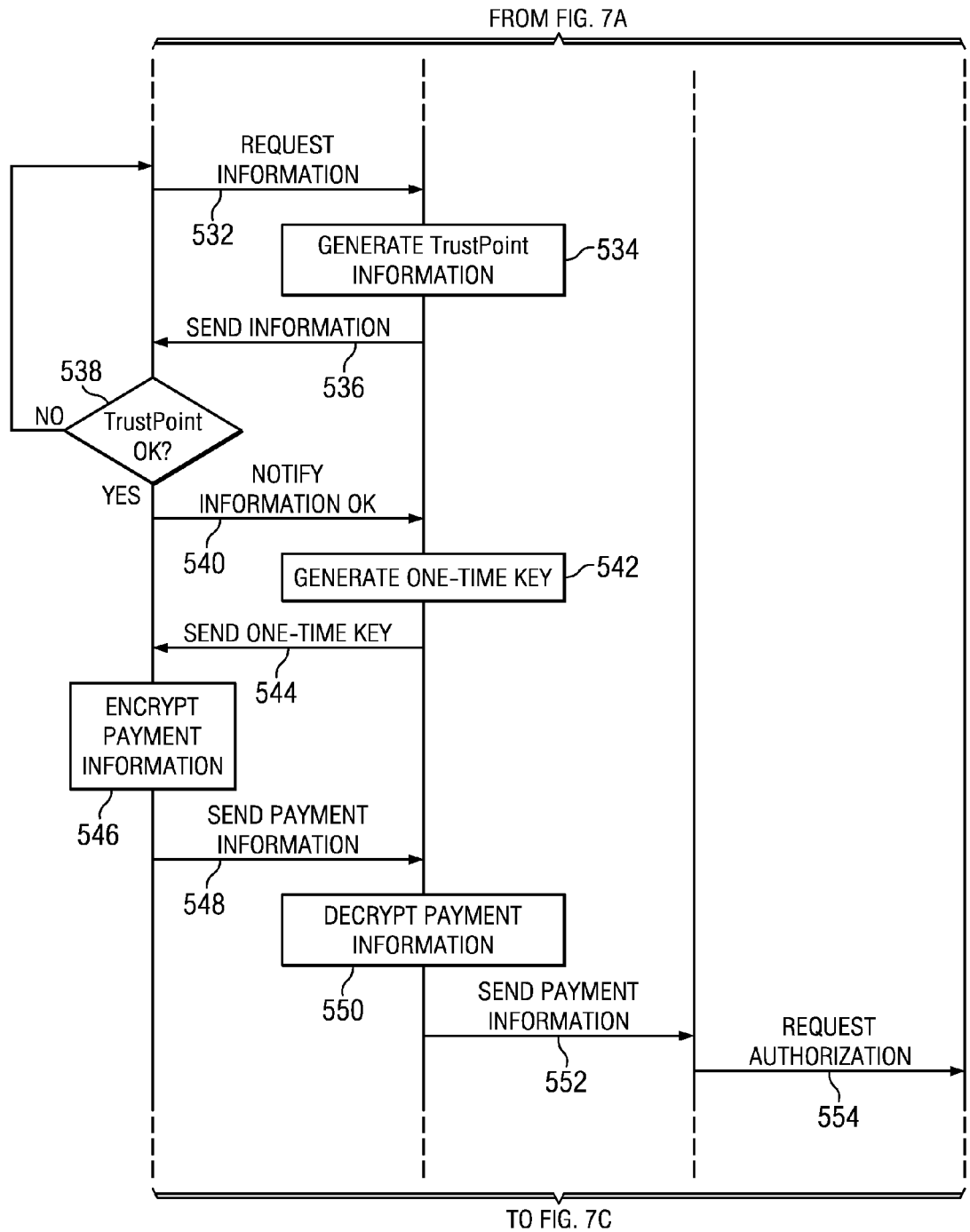
Figure 7C:
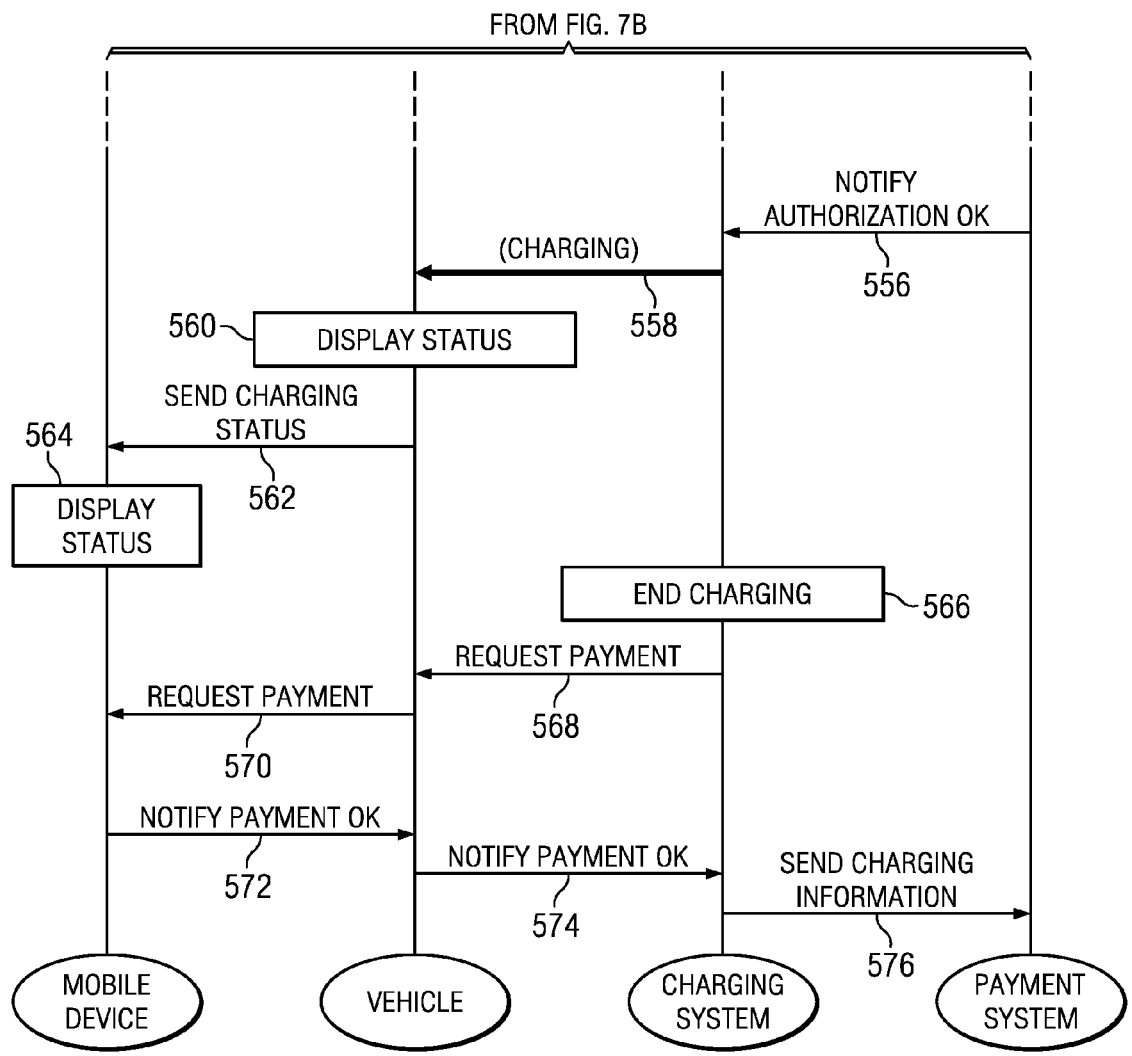

FIG. 7 illustrates another example of a method for charging the battery of the vehicle. Steps 510 through 520 may be substantially similar to steps 432 through 442 of FIG. 6.

Mutual authentication is performed at steps 522 through 540 to establish trust between the mobile trust point and the vehicle trust point. The vehicle trust point requests information from the mobile trust point at step 522. The mobile trust point generates the trust point information at step 524, and sends the information to the vehicle trust point at step 526. The vehicle trust point checks whether the mobile trust point is acceptable at step 528. If the mobile trust point is not acceptable, the method returns to step 522, where the information is requested again. If the mobile trust point is acceptable, the method proceeds to step 530, where the vehicle trust point notifies the mobile trust point that the mobile trust point is acceptable.

The mobile trust point requests information from the vehicle trust point at step 532. The vehicle trust point generates trust point information at step 534 and sends the information to the mobile trust point at step 536. The mobile trust point checks whether the vehicle trust point is acceptable at step 538. If the vehicle trust point is not acceptable, the method returns to step 532, where the information is requested again. If the vehicle trust point is acceptable, the method proceeds to step 540, where the mobile trust point notifies the vehicle trust point that the vehicle trust point is acceptable.

The vehicle trust point generates a one time key at step 542 and sends the one time key to the mobile trust point at step 554. The mobile trust point encrypts payment information at step 546 using the one time key. Encrypted payment information may include, for example, an encrypted credit card number. The mobile trust point then sends the encrypted payment information to the vehicle trust point at step 548. The vehicle trust point decrypts the payment information at step 550. Steps 552 through 576 may be substantially similar to steps 444 through 464.

Figure 8A:
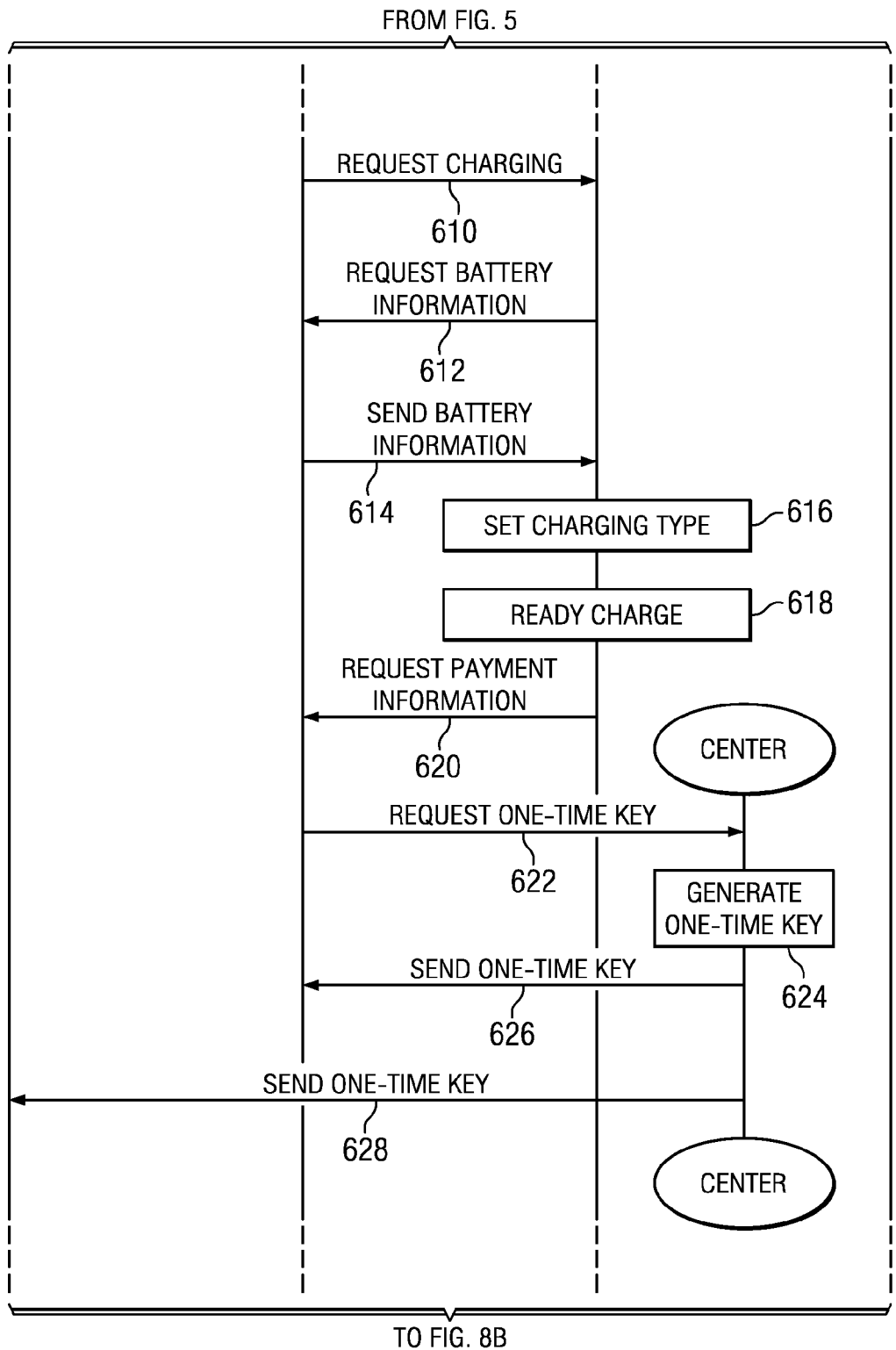
Figure 8B:
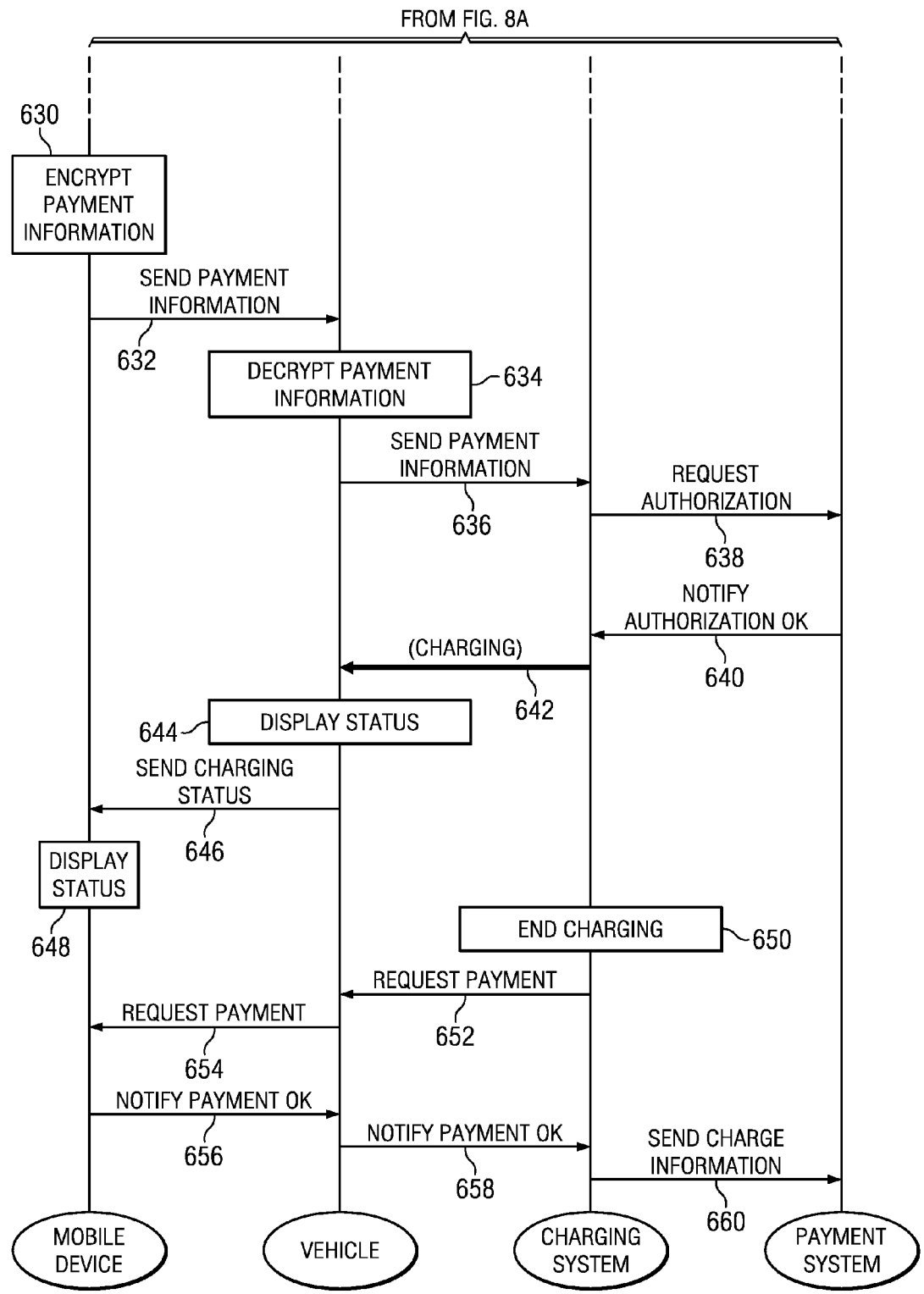

FIG. 8 illustrates another example of a method for method for charging the battery of the vehicle. Steps 610 through 620 may be substantially similar to steps 432 through 442.

Steps 622 through 628 describe a vehicle service center generating a key for the mobile device. The vehicle trust point requests a one time key from the center trust point at step 622. The center trust point generates the one time key at step 624 and sends the one time key to the vehicle trust point at step 626 and to the mobile trust point at step 628. Steps 630 through 660 may be substantially similar to steps 546 through steps 576.

Figure 9:
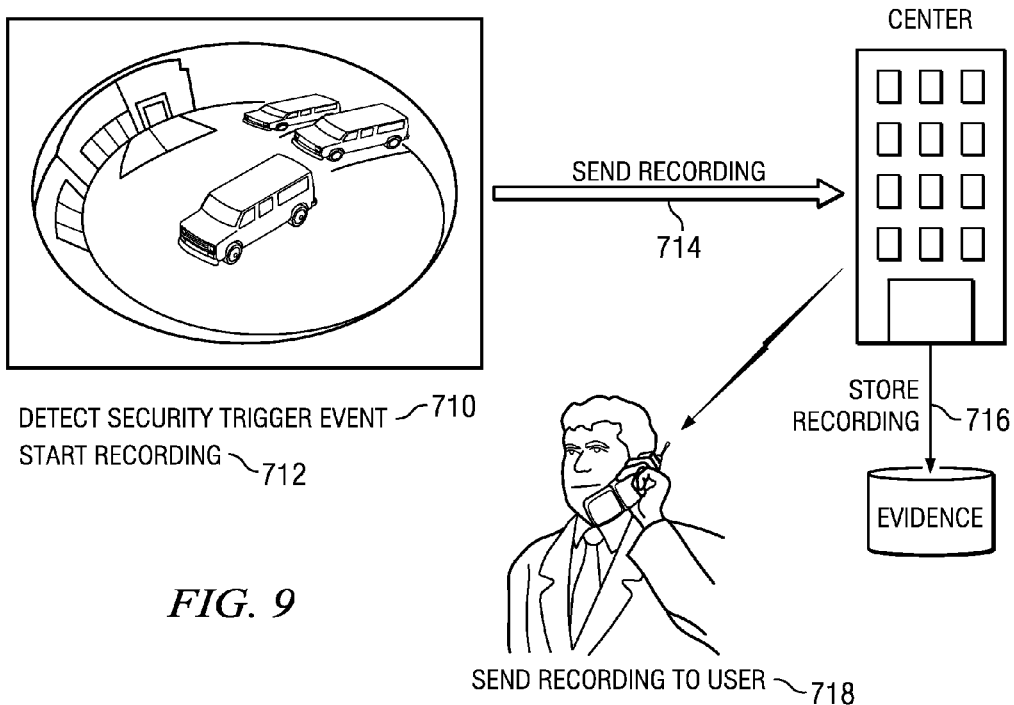
FIG. 9 illustrates an example of a method for providing a vehicle security service.

FIG. 9 illustrates an example of a method for providing a vehicle security service. The method may be performed by a vehicle trust point of a vehicle in a vehicle environment. The vehicle environment may include at least a portion of any of the following: the interior of the vehicle, the exterior of the vehicle, and/or the area surrounding the vehicle.

A security trigger event is detected at step 710. A security trigger event may be a visual occurrence (such as a flash), an auditory occurrence (such as a crash), or a movement (such as a shaking or vibration).

The vehicle environment is recorded to yield a recording at step 712. The vehicle environment may be recorded by any suitable device configured to detect visual and/or auditory signals, such as a camera or a recorder. The recording is sent to a center trust point at step 714.

The center trust point stores the recording in a database at step 716. The stored recording may be used as evidence in a trial concerning the security trigger event. The center trust point sends the recording to a mobile trust point at step 718. The user of the mobile device may then play the recording.

Figure 10:
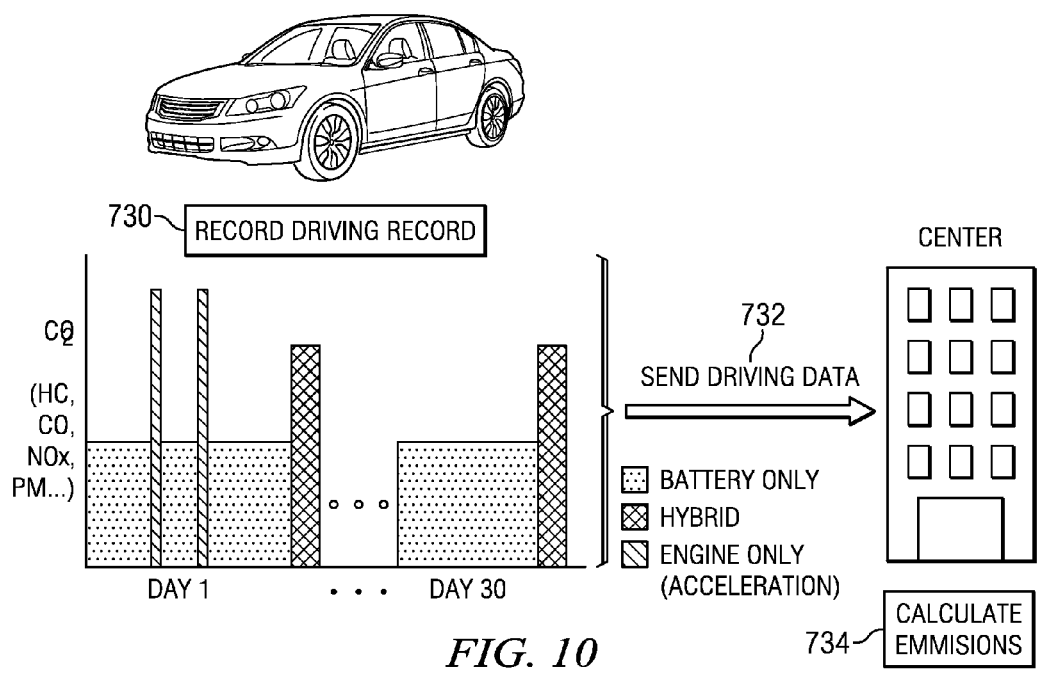
FIG. 10 illustrates an example of a method for providing an emissions reporting service.

FIG. 10 illustrates an example of a method for providing an emissions reporting service. The method may be performed by a vehicle trust point of a vehicle.

Driving data is gathered at step 730. Driving data may include any suitable data from which emissions may be calculated. For example, the data may include the temperature, noise, and emissions detected from the exhaust. The driving data may identify emissions that are emitted when only the battery is operating, only the engine is operating, or when both are operating. In certain embodiments, personal data about the user may not be included in the driving data. In other embodiments, the personal data may be included.

The driving data is sent to a center trust point at step 732. The center trust point calculates emission values of the vehicle at step 734. For example, carbon dioxide emissions may be calculated.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. For example, the operations of trust point modules 132 and service modules 134 may be performed by one component, or the operations of a module 132 or 134 may be performed by more than one component. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

In certain embodiments, an entity that performs a first step that precedes (such as leads to) a second step may be regarded as facilitating the second step. For example, if an entity performs step A that precedes step B, the entity also facilitates step B. In certain embodiments, a first entity that performs a first step that precedes a second step that may be performed by a second entity may be regarded as allowing the second entity to perform the second step. For example, if a first entity performs step A that precedes step B that may be performed by a second entity, the first entity also allows the second entity to perform step B.

A component of the systems and apparatuses disclosed herein may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible media and may perform operations when executed by a computer.

Certain logic, such as a processor, may manage the operation of a component. A processor may comprise logic (such as a device or apparatus) operable to interpret and/or execute other logic. Examples of a processor include one or more of any of the following a computer, microprocessor, microcontroller, digital signal processor (DSP), application specific integrated circuit (ASIC), or any other digital or analog circuitry configured to interpret and/or execute program instructions and/or process data.

In particular embodiments, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

Logic such as electronic content ("content"), for example, software (including updates) may include files, code (such as object or executable code), data records, and/or any other electronically recorded data structure that a client may access. Examples may include text files, spreadsheets, email, medical records, images, web pages, programs (such as word processing and file management programs), and/or other electronic data or programs.

A memory stores information. A memory may comprise one or more non-transitory, tangible, computer-readable, and/or computer-executable storage media. Examples of memory include computer memory (for example, Random Access Memory (RAM), Read Only Memory (ROM), or electrically erasable programmable read-only memory (EEPROM)), mass storage media (for example, a hard disk), removable storage media (for example, a Compact Disk (CD) or a Digital Video Disk (DVD)), database and/or network storage (for example, a server), and/or other computer-readable medium or volatile or non-volatile memory that retains data even if power is not supplied.

Components of the systems and apparatuses may be coupled by any suitable communication network that communicates according to any suitable communication protocol. A communication network (such as network 18) may comprise all or a portion of one or more of the following: a public switched telephone network (PSTN), a public or private data network, a local area network (LAN), a metropolitan area network (MAN), a wide area network (WAN), a local, virtual private network (VPN), regional, or global communication or computer network such as the Internet, a wireline or wireless network, an enterprise intranet, other suitable communication link, or any combination of any of the preceding. A communication network may include routers, hubs, switches, gateways, call controllers, and/or any other suitable components in any suitable form or arrangement.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method comprising:
    establishing, by a vehicle trust point system of a vehicle, trust with a first trust point system by:
        receiving at least one of user information and device information from the first trust point system; and
        authenticating a user of the vehicle or a device associated with the user of the vehicle according to the user information or the device information;
    receiving a task list comprising a plurality of tasks from the first trust point system, the tasks to be performed by the user of the vehicle;
    establishing trust with a second trust point system by sending vehicle trust point information to the second trust point system to allow the second trust point system to authenticate the vehicle trust point system based on a version of software on the vehicle, wherein the second trust point system is different than the first trust point system;
    obtaining a route to perform the plurality of tasks from the second trust point system; and
    instructing the vehicle to move along the route.

2. The method of claim 1, further comprising:
    receiving second trust point information from the second trust point system;
    authenticating the second trust point system according to the second trust point information; and
    sending payment information to the second trust point system.

3. A method comprising:

authenticating, by a vehicle trust point system of a vehicle, a charging trust point system, wherein the vehicle trust point system is different than the charging trust point system;

sending vehicle trust point information to a mobile trust point system associated with a user of the vehicle to allow the mobile trust point system to authenticate the vehicle trust point system;

sending vehicle trust point information to the charging trust point system to allow the charging trust point system to authenticate the vehicle trust point system based on a version of software on the vehicle;

sending battery information of a battery of the vehicle to the charging trust point system; and sending payment information corresponding to the vehicle to the charging trust point system to allow the charging trust point system to charge the battery.

4. The method of claim 3, further comprising receiving the payment information from the mobile trust point system.

5. The method of claim 3, further comprising:

sending a key to the mobile trust point system to allow the mobile trust point system to encrypt the payment information.

6. The method of claim 3, further comprising: displaying a charging status indicating a charge of the battery.

7. The method of claim 3, further comprising:

sending a charging status indicating a charge of the battery to the mobile trust point system to allow the mobile trust point system to display the charging status.

8. The method of claim 3, further comprising: receiving a key from a trust point center; and sending the key to the mobile trust point system to allow the mobile trust point system to encrypt the payment information.

\* \* \* \* \*